Aug. 23, 1966   F. JAKOB   3,267,684
METHOD AND APPARATUS FOR LOW-TEMPERATURE SEPARATION OF GASES
Filed Jan 19, 1962   3 Sheets-Sheet 2
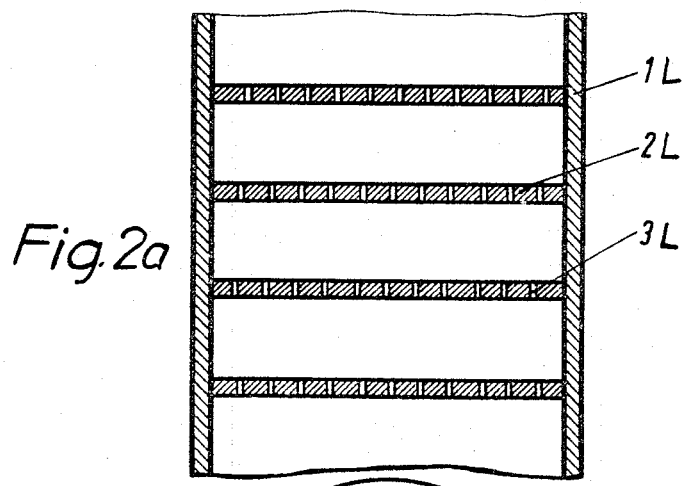
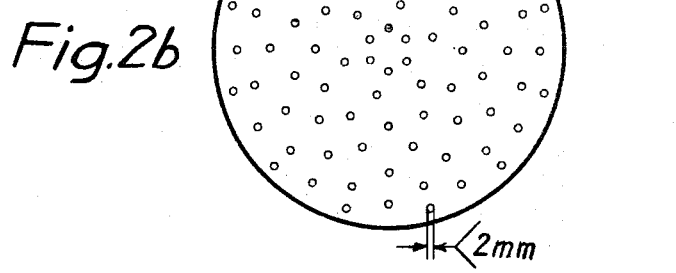
INVENTOR
FRITZ JAKOB
BY
*J. William Millen*
ATTORNEY INVENTOR
FRITZ JAKOB
BY D. William Miller
ATTORNEY United States Patent Office 3,267,684
Patented August 23, 1966

3,267,684
METHOD AND APPARATUS FOR LOW-TEMPERATURE SEPARATION OF GASES
Fritz Jakob, Achmuhle, near Wolfratshausen, Germany, assignor to Linde Aktiengesellschaft, Wiesbaden, Germany
Filed Jan. 19, 1962, Ser. No. 167,330
Claims priority, application Germany, Jan. 26, 1961, G 31,471
6 Claims. (Cl. 62—29)

The present invention relates to low-temperature separation of gases by rectification, more particularly, to a method and an apparatus for the intermittent operation of the rectification during the gas separation process.

Various continuous methods for the low-temperature rectification of gas mixtures are known. To carry out such continuous processes, baffles or trays are used in the rectification columns which permit the simultaneous passage of both liquid and vapor. The liquid and vapor must be brought into intimate contact upon each tray in order that the composition of the two phases corresponds to the balance. For this purpose a number of structures has been devised some of which structures require rather expensive installations.

A common tray or baffle structure and one which is simple in construction is a so-called screen or filter baffle comprising a plurality of small perforations therein with there being a large opening in the baffle on one edge thereof adjacent the wall of the column. A shoulder is provided on the baffle adjacent the opening so as to define a small dam or weir which controls the level of liquid accumulating on the tray. The large baffle openings are staggeredly arranged with respect to each other so that liquid flowing through the opening of one baffle falls onto the next-succeeding tray. With this arrangement the vapor passes upwardly through the small perforations and the liquid falls downwardly through the large openings.

Each of the trays may be provided in the center thereof with a raised portion so as to direct the liquid in a circular movement. Since the tray openings for the liquid are displaced with respect to each other, the liquid circulates downwardly through the column in a spiral movement.

The above-described and known construction, while relatively simple, has several disadvantages. The output of such a rectification column is limited because only a limited quantity of liquid can flow through the openings. In addition, the length of the dam-like shoulders on the trays is linear with respect to the dimensions of the tray, while the quantity of liquid accumulating thereon increases as the square. This discrepancy can be compensated for only in a limited sort of way by the height of the shoulder.

Other known structures for carrying out such rectification are considerably more complicated than that described above and hence these rectification installations are expensive.

It is therefore the principal object of the present invention to provide a process and an apparatus whereby low-temperature rectification of gases can be carried out intermittently.

It is a further object of the present invention to provide a process and an apparatus for the low-temperature rectification of gases wherein greater outputs of the rectification columns can be obtained.

In general, any intermittent processes for rectification have been avoided since, mathematically, they are very difficult to control. In addition, it was considered by technical personnel that the rectification process would be adversely affected by intermittent operation.

The present invention, however, provides a relatively simple structure by which such low-temperature rectification can be carried out intermittently. In addition, the operation of this process is not limited to a maximum flow of liquid through the column. Furthermore, the method of this invention assures extremely good contact between the liquid and vapor phases.

The present invention is carried out in a rectification column having horizontal baffles or trays which are provided with openings having a small cross-section. In this process the liquid and vapors are passed through the same openings in the trays. In one stage of the method the rectification vapors produced by heating of the material in the sump of the column pass upwardly through the perforations in the trays. In a second stage of the process the liquid on the trays is passed downwardly through the perforations to the next-successive tray.

The passage of the liquid through the perforations is accomplished by abruptly increasing the gas pressure in the upper portion of the column. This, in turn, forces the liquid down through the perforations. The second stage during which the liquid passes downwardly through the perforated trays is of substantially less duration than the first stage during which the vapor flows upwardly through the perforations and the liquid accumulated on the trays.

It is not necessary that this method be carried out in all the columns of multi-stage rectification arrangement. In addition, the method may be applied to only a part of a rectification column. The method can also be used advantageously in all rectification processes and is not limited to low-temperature gas separation.

Other objects and advantages of this invention will be apparent upon reference to the accompanying description when taken in conjunction with the following drawing, which shows schematically a two-stage rectification column for carrying out the process of this invention.

Referring now to the drawings:

FIGURE 2a is a vertical cross section of several perforated plates disposed inside a low pressure column;

FIGURE 2b is a plan view of a perforated plate of this invention; and

Figure 1:
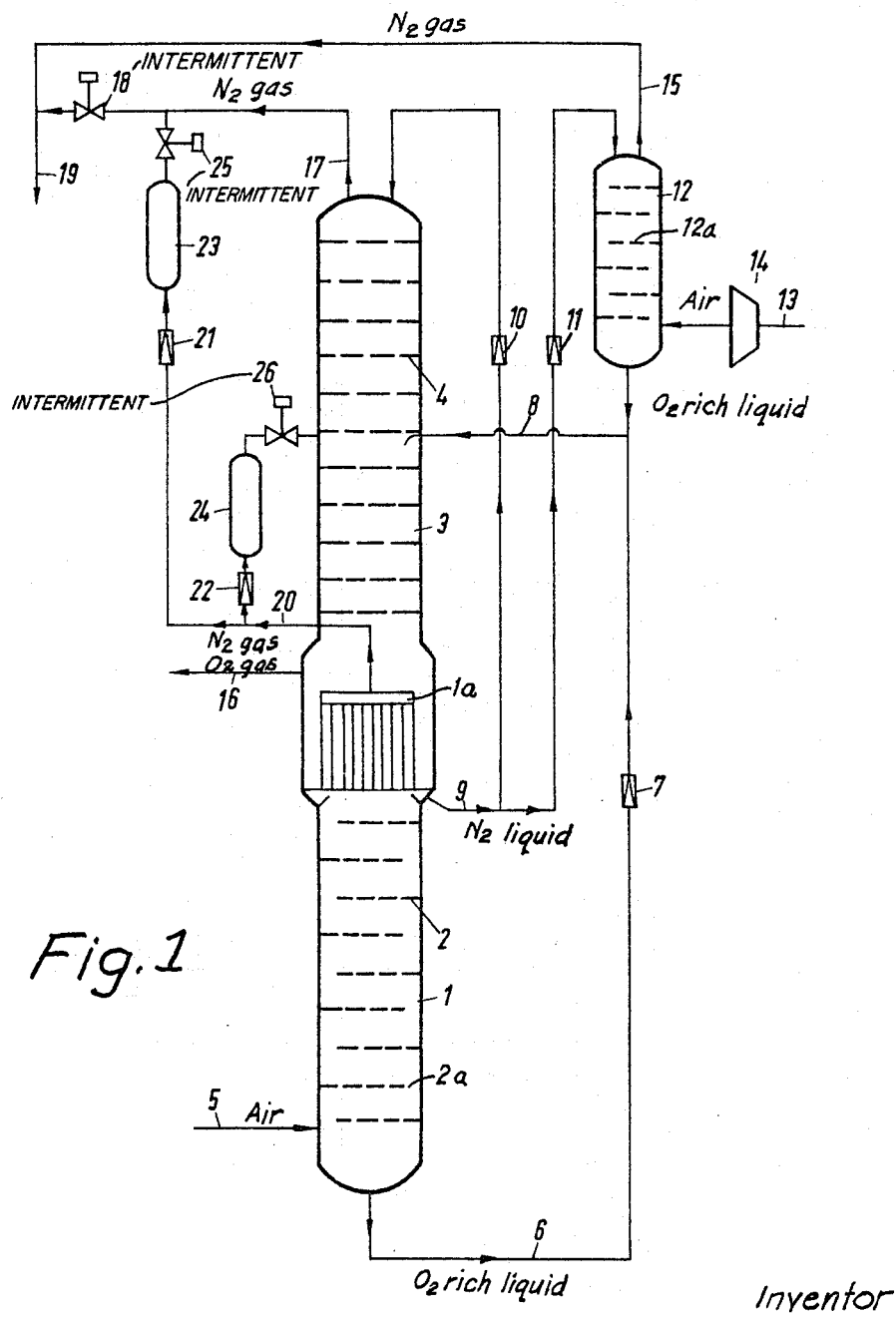
FIGURE 1 is a schematic elevation of a double fractionating column with auxiliary features by which intermittent rectification can be accomplished.

As shown in FIGURE 1, the installation comprises a higher pressure rectification column 1 which is provided with a plurality of vertically spaced horizontal trays 2 which are perforated and have staggered openings at the side edges thereof.

The installation also comprises a lower pressure rectification column 3 which has a plurality of horizontal perforated plates 4 which function as rectification trays or baffles. Referring to FIGURES 2a and 2b, these perforations 31 are circular in shape so as to form a plurality of cylindrical openings through the trays. The cross-sectional area of these perforations essentially depends on the viscosity and surface tension as well as the moistening properties of the substances passing through the column. Generally, these openings have a cross-sectional area on the order of squared millimeters and less. For the separation of air the perforations have diameters of less than two millimeters and preferably less than 1.7 millimeters. The distances between the individual perforations are only about several millimeters, as indicated by solid portions 2L between walls 1L in FIGURES 2a and 2b.

In most installations these perforations will be circular and will be uniform in size since such perforations would be most economical to fabricate. However, it is pointed out that the cross-sectional areas of these perforations can have any desired shape dependent on the particular substance being rectified and also the perforations need not be uniform but may be of various sizes.

The air which is to be separated is cooled in regeneration 101 (FIGURE 3) and then introduced into the column 1 through a supply conduit 5. The air is then separated within the column into an oxygen-rich liquid which accumulates in the sump of the column 2 and is withdrawn through conduit 6. This liquid is then expanded in valve 7 and introduced through conduit 8 into the lower pressure rectification column 3. While in this instance the liquid is oxygen-rich, generally, the liquid may be described as enriched with a higher boiling point component of the gas mixture to be separated.

Liquid nitrogen which accumulates in the sump of the column 3 is withdrawn through conduit 9, expanded in valve 10 and then introduced into the head of column 3 for use as a reflux or washing liquid.

Another portion of the liquid nitrogen withdrawn through the conduit 9 is expanded in a valve 11 and introduced into the head of an additional rectification column 12 which is provided with the conventional rectification trays. The column 12 separates air which had been first cooled in regenerator 101 and then was withdrawn therefrom by means of conduit 13, and subsequently expanded in an expansion turbine 14 while simultaneously producing work. The oxygen-rich liquid sump product produced in the column 12 is then introduced into the column 3 also through the conduit 8. Gaseous nitrogen is withdrawn from the head of column 12 through conduit 15.

The rectification column 12 functions to insulate the expansion turbine 14 from the effects of the intermittent rectification process in the column 3 which will be presently described.

Gaseous oxygen, as a higher boiling point product, is withdrawn from the base of the column 3 through conduit 16.

Gaseous nitrogen, as a lower boiling point product, is withdrawn from the head of the column 3 through conduit 17, conveyed through an automatic valve 18, whose function will be presently described, and combined with the nitrogen coming through conduit 15 from column 12. These combined supplies of nitrogen are then flowed to the main heat-exchanger device through conduit 19.

Gaseous nitrogen is withdrawn from the head of the higher pressure column 1 after passing through a condenser 1a through a conduit 20. The condenser 1a is of the conventional type and functions in the known manner for a two-stage rectification column. A portion of the gaseous nitrogen withdrawn through conduit 20 is led to storage vessels or containers 23 and 24 through reduction valves 21 and 22, respectively. These storage vessels are connected with the rectification column 3 through automatic valves 25 and 26, respectively.

During the intermittent rectification process as disclosed by this invention, the column 3 is operated in such a manner that the valve 18 is open and the valves 25 and 26 are closed. During this stage of operation the rectification vapors flow upwardly through the column 3, through the perforations of the trays 4 and through the liquid accumulated on these trays. Since the valve 18 is open, gaseous nitrogen continues to be discharged from the head of the column 3 through line 17.

During the second stage of operation, which stage is considerably shorter than the first stage and generally lasts only a few tenths of a second, valve 18 is closed and valves 25 and 26 are opened. These valves are connected into a control circuit so that their actions are synchronized in a known manner.

With the opening of the valves 25 and 26 the quantities of gas stored in the vessels 23 and 24 are introduced into the top and central portions of the column 3. This suddenly increases the pressure within the column 3 and forces large amounts of the liquid downwardly through the perforations of the trays.

After this short second stage is terminated, the valves 25 and 26 are closed, the valve 18 opened and the rectification process continues as described above.

In such an installation, regenerators are generally used to cool the incoming gas mixture and to remove certain impurities therefrom. Where regenerators are used, it is preferable to synchronize the operations of the valves 18, 25 and 26 with the cyclical exchange of functions of the regenerators. Thus, while the regenerators are operating normally, the first stage of the rectification process will occur. However, during the switching-over process of the regenerators, which occurs cyclically in a known manner, the second stage of the rectification process occurs.

Figure 3:
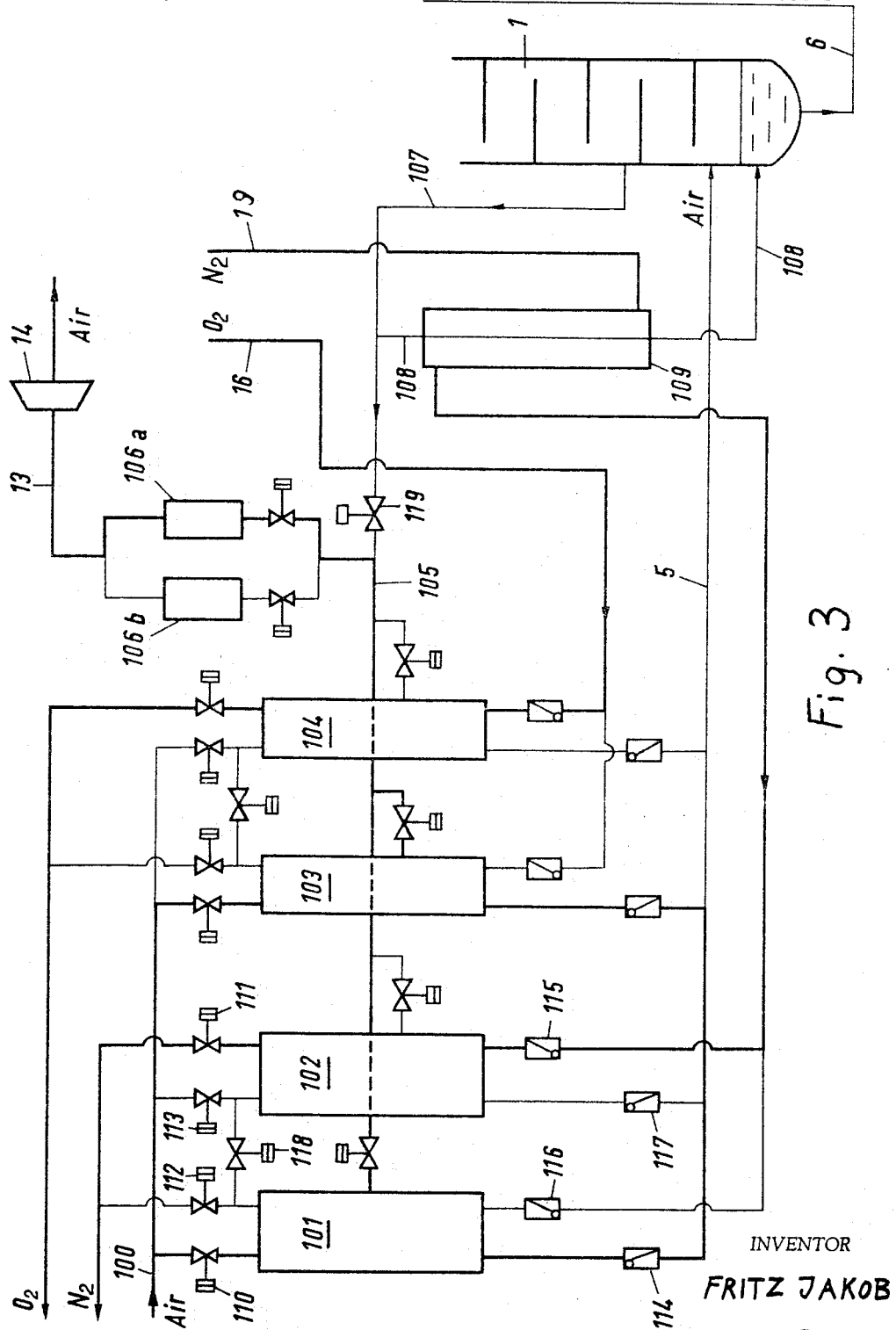
FIGURE 3 is a schematic representation of a typical conventional system wherein air is treated in sets of interchangeable reversible regenerators.

Referring to FIGURE 3, a typical regenerator system is illustrated. At the left-hand side of the figure, crude air is passed through conduit 100, and is divided into two portions. One portion passes through switching valve 110, and then through regenerator 101 (operating interchangeably on the air-nitrogen cycle with regenerator 102) wherein impurities, such as water and carbon dioxide, are congealed. Purified air is then passed from the bottom of regenerator 101 through check valve 114 and into conduit 5 which leads into the bottom portion of high pressure column 1.

The other portion of the crude air is passed in a similar manner through regenerator 103 which operates on the air-oxygen cycle interchangeably with regenerator 104. Cooled purified air from the bottom of regenerator 103 is passed into conduit 5 where it is mixed with cooled purified air from regenerator 101.

Not all of the air from the regenerators is passed into conduit 5 because a portion from regenerator 101 is withdrawn from the midsection thereof and passed through conduit 105 into $CO_2$ adsorber 106a which is interchangeably connected with its companion adsorber 106b. When it is time for adsorber 106a to be desorbed of its impurities, valve 119 is opened to permit the gas in conduit 107 to desorb the $CO_2$. The purified air is then withdrawn from adsorber 106a, passed through line 13, and expanded in turbine 14 where it is cooled. The cold air leaving turbine 14 is then passed to the bottom section of auxiliary column 12 (see FIGURE 1).

During the cycle shown in FIGURE 3, relatively pure nitrogen is passed through conduit 19 through heat exchanger 109 where it is warmed somewhat by crude gaseous nitrogen in conduit 108 withdrawn from column 1 via conduit 107. The resultant pure nitrogen stream leaving heat exchanger 109 is then passed via check valve 115 into regenerator 102 where it cools the regenerator and removes impurities deposited therein. The nitrogen stream is then withdrawn via switching valve 111 and then passed out of the system. In a similar manner, pure oxygen is passed through conduit 16, through regenerator 104, and then to its ultimate use.

When regenerators 101 and 102 are switched over, switching valves 110, 111, and 118 are closed, and valves 112 and 113 are open. Switching between regenerators 103 and 104 is substantially the same as the switching between regenerators 101 and 102. It is during this switching-over process that the second stage of the intermittent rectification is conducted.

Liquid enriched in oxygen is passed from the bottom of the high pressure column to conduit 6, and, as seen from FIGURE 1, through valve 7 and then into the midportion of low pressure column 3.

If only small quantities of oxygen-rich liquid are introduced into the column 3 through conduit 8, it is possible to simplify the above-described installation by eliminating the valve 22, storage vessel 24 and valve 26.

With the regenerators as described above it is possible to force the accumulated liquid through the perforated trays solely by means of pressure shocks occurring when the regenerators are switched over to different functions. These pressure shocks are produced by temporarily interrupting the withdrawal of the nitrogen gas through the conduit 17.

The number of perforations in the individual trays is determined by the quantity of liquid which is to flow through the column.

The process of the present invention can be carried out in several other alternative ways.

One such alternative is to periodically throttle or interrupt the nitrogen gas being withdrawn from the column 3 through conduit 17. Since a portion of the reflux liquid supplied to the head of the column 3 continuously evaporates, caused to some extent by the throttle expansion, a small excess pressure is produced in the column 3. As a result, a quantity of liquid corresponding to this excess quantity of gas is forced through the trays openings onto the next-succeeding baffle.

In a corresponding manner the pressure of the column can be lowered in the bottom portion thereof by increasing the quantity of the gaseous sump product which is withdrawn therefrom. This decrease in pressure will have the same effect, namely that liquid in the trays 4 will be forced downwardly through the perforations therein.

Thus it can be seen that the present invention provides a simple yet effective process and apparatus for carrying out an intermittent low-temperature rectification of gas mixtures such as air.

It will be understood that this invention is susceptible to modification in order to adapt it to different usages and conditions and, accordingly, it is desired to comprehend such modifications within this invention as may fall within the scope of the appended claims.

What is claimed as this invention is:

1. A process for low temperature separation of gas mixtures and comprising the steps of rectifying a first part of the gas mixture to be separated in a first column to obtain a lower boiling point product and a liquid enriched with a higher boiling point component of said gas mixture; expanding a second part of the gas mixture to be separated to produce external work; rectifying said second part of the gas mixture to be separated in a third column to obtain a lower boiling point product and a liquid enriched with a higher boiling point component of said gas mixture; withdrawing the liquids enriched with a higher boiling component of said gas mixture from said first column and said third column and rectifying these in a second column so that rectification vapors pass upwardly through perforated baffles, and liquids accumulate on the perforated baffles to obtain a lower boiling point product and a higher boiling point product, the first column being at a higher pressure than the second column; storing the lower boiling point product produced in the first column; and intermittently releasing the stored lower boiling point product into the head of the second column to intermittently force the liquids accumulating on the perforated baffles downwardly therethrough, thereby periodically interrupting the upward flow of rectification vapors in said second column.

2. A process for low temperature separation of gas mixtures comprising the steps of rectifying a gas mixture in a first high pressure column to obtain a lower boiling point product and a liquid enriched with a higher boiling point component of the gas mixture to be separated, rectifying in a second low pressure column the liquid enriched with a higher boiling point component of the gas mixture to be separated whereby rectification vapors pass upwardly through perforations in horizontally disposed baffles which completely extend across said second column, and liquids accumulate on the perforated baffles to obtain a lower boiling point product and a higher boiling point product, maintaining during a first cycle the flow of vapors upwardly through said perforations at a rate such that substantially all of the liquid remains on the baffles and does not run down through the perforations, storing a portion of the lower boiling point gaseous product produced in the first higher pressure column, and intermittently in a second cycle interrupting the rectification in said second column by throttling discharge of gaseous effluent from an upper portion thereof while simultaneously releasing stored higher pressure gas into an upper portion of the second column to increase the pressure therein and to intermittently force the liquids accumulating on the perforated baffles downwardly therethrough, thereby periodically interrupting rectification in the second column.

3. A process for low temperature separation of gas mixtures and comprising the steps of rectifying a gas mixture in a first column to obtain a lower boiling point product and a liquid enriched with a higher boiling point component of the gas mixture to be separated, rectifying in a second column the liquid enriched with a higher boiling point component of the gas mixture to be separated whereby rectification vapors pass upwardly through perforations in horizontally disposed baffles which completely extend across said second column, and liquids accumulate on the perforated baffles to obtain a lower boiling point product and a higher boiling point product, maintaining during the first cycle the flow of vapor upwardly through said perforations at a rate such that substantially all of the liquid remains on the baffles and does not run down through the perforations, and periodically in a second cycle increasing the gas pressure in an upper portion of the second column, thereby to force liquid on said baffles downwardly through the perforations therein and to intermittently interrupt rectification therein.

4. A process for low temperature separation of gas mixtures comprising the steps of rectifying a gas mixture in a first high pressure column to obtain a lower boiling point product and a liquid enriched with a higher boiling point component of a gas mixture to be separated, rectifying in a second low pressure column the liquid enriched with a higher boiling point component of the gas mixture to be separated whereby rectification vapors pass upwardly through perforations in horizontally disposed baffles which completely extend across said second column, and liquids accumulate on the perforated baffles to obtain a lower boiling point product and a higher boiling point product, maintaining during a first cycle the flow of vapors upwardly through said perforations at a rate such that substantially all of the liquid remains on the baffles and does not run down through the perforations, storing a portion of the lower boiling point gaseous product produced in the first higher pressure column, and intermittently releasing in a second cycle stored higher pressure gas into an upper section of the second column to increase the pressure therein and to intermittently force the liquids accumulating on the perforated baffles downwardly therethrough, thereby periodically interrupting rectification in the second column.

5. A process for low temperature separation of gas mixtures and comprising the steps of cooling and cleaning a gas mixture in reversible regenerators, rectifying the cleaned and cooled gas mixture in a first column to obtain a lower boiling point product and a liquid enriched with a higher boiling point component of the gas mixture to be separated, rectifying in a second column the liquid enriched with a higher boiling point component of the gas mixture to be separated whereby rectification vapors pass upwardly through perforations in horizontally disposed baffles which completely extend across said second column, and liquids accumulate on the perforated baffles to obtain a lower boiling point product and a higher boiling point product, maintaining during a first cycle the flow of vapor upwardly through said perforations at a rate such that substantially all of the liquid remains on the baffles and does not run down through the perforations, periodically interrupting in a second cycle the rectification in said second column by throttling discharge of gaseous effluent from an upper portion thereof simultaneously with switching over of the regenerators to exchange functions therebetween, thereby to intermittently increase the gas pressure in the upper portion of the second column to force liquids accumulating on the baffles to flow downwardly through the perforations therein.

6. In an apparatus for the low-temperature separation of gaseous mixtures, the combination comprising: a first rectification column; a second rectification column having positioned therein vertically spaced horizontal baffle plates having a plurality of small openings; a third rectification column; a condenser-evaporator being operatively connected to the head of said first column and the sump of said second column; an expansion turbine having a high-pressure side and a low-pressure side, the high-pressure side being connected to a source of a high-pressure gaseous mixture, and the low-pressure side being connected to the third column; first conduit means leading from the bottom of said third column and from the bottom of said first column to above the bottom of said second column; second conduit means leading from the head of the first column to the head of the second column; intermittent gas flow means for interrupting upward flow of vapor in said second column, said intermittent gas flow means positioned within said second conduit means, and comprising reducing valve means, storage vessel means, and automatic valve means.

References Cited by the Examiner
UNITED STATES PATENTS

| | | | |
|---|---|---|---|
| 959,563 | 5/1910 | Levy | 62—29 |
| 1,449,291 | 3/1923 | Mewes | 62—32 |
| 1,472,294 | 10/1923 | Airme | 62—32 |
| 1,498,766 | 6/1924 | Van Nuys | 62—22 |
| 1,510,178 | 9/1924 | Lachmann | 62—29 |
| 2,040,108 | 5/1936 | Schlitt | 62—29 |
| 2,051,576 | 8/1936 | Schlitt | 62—29 X |
| 2,550,679 | 5/1951 | Engel | 62—12 |
| 2,587,820 | 3/1952 | Cartier | 62—42 |
| 2,633,717 | 4/1953 | Paget | 62—42 |
| 2,664,719 | 1/1954 | Rice | 62—14 X |
| 2,704,930 | 3/1955 | Pool | 62—19 |
| 2,777,299 | 1/1957 | Skeperdas | 62—15 |
| 2,846,853 | 8/1958 | Matsch | 62—38 X |
| 2,930,201 | 3/1960 | Karwat | 62—22 |
| 2,934,980 | 5/1960 | Latimer | 62—29 X |

NORMAN YUDKOFF, *Primary Examiner.*
EDWARD J. MICHAEL, *Examiner.*
V. W. PRETKA, J. J. JOHNSON, R. C. STEINMETZ,
*Assistant Examiners.*